(12) United States Patent
Johnston

(10) Patent No.: US 7,982,115 B2
(45) Date of Patent: Jul. 19, 2011

(54) MUSIC NOTATION SYSTEM

(76) Inventor: James S. Johnston, Edmonton (CA)

( * ) Notice: Subject to any disclaimer, the term of this patent is extended or adjusted under 35 U.S.C. 154(b) by 0 days.

(21) Appl. No.: 12/818,967

(22) Filed: Jun. 18, 2010

(65) Prior Publication Data

US 2010/0251875 A1    Oct. 7, 2010

Related U.S. Application Data

(63) Continuation of application No. 11/955,730, filed on Dec. 13, 2007, now Pat. No. 7,767,895.

(51) Int. Cl.
*G09B 15/02* (2006.01)

(52) U.S. Cl. ...................................... 84/483.2

(58) Field of Classification Search ................... 84/483.2
See application file for complete search history.

(56) References Cited

U.S. PATENT DOCUMENTS

| | | | |
|---|---|---|---|
| 104,393 A | 6/1870 | Wright | |
| 347,686 A | 8/1886 | Carpenter et al. | |
| 608,771 A | 8/1898 | Guilford | |
| 759,575 A | 5/1904 | White | |
| 1,473,495 A | 11/1923 | Miller | |
| 1,483,380 A | 2/1924 | Reeve | |
| 1,539,308 A | 5/1925 | Faunt | |
| 1,594,194 A | 7/1926 | Burgess | |
| 1,838,284 A * | 12/1931 | Refsgaard | 84/483.1 |
| 2,157,168 A | 5/1939 | Fine | |
| 2,232,264 A | 2/1941 | Petersen | |
| 2,271,772 A * | 2/1942 | Maffei | 84/483.1 |
| 2,360,534 A * | 10/1944 | Allen | 84/483.1 |
| 2,406,946 A | 9/1946 | Firestone | |
| 3,369,439 A * | 2/1968 | Burdet | 84/483.1 |
| 3,460,425 A * | 8/1969 | Kiepe | 84/470 R |
| 3,562,394 A * | 2/1971 | Kiepe | 84/678 |
| 3,698,277 A * | 10/1972 | Barra | 84/483.1 |
| 5,392,682 A | 2/1995 | McCartney-Hoy | |
| 5,886,273 A * | 3/1999 | Haruyama | 84/478 |
| 5,962,800 A | 10/1999 | Johnson et al. | |
| 5,998,721 A | 12/1999 | Lepinski | |
| 6,124,540 A | 9/2000 | Lotito | |
| 6,388,181 B2 * | 5/2002 | Moe | 84/477 R |
| 6,407,323 B1 | 6/2002 | Karapetian | |
| 6,476,303 B1 | 11/2002 | Mutou et al. | |

(Continued)

OTHER PUBLICATIONS

Piano Roll Graph Paper, by J. B. Roth, Jul. 19, 2000, Nov. 1, 2007.*

(Continued)

*Primary Examiner* — Elvin G Enad
*Assistant Examiner* — Robert W Horn
(74) *Attorney, Agent, or Firm* — Donald V. Tomkins

(57) ABSTRACT

A music notation system uses a grid with vertical columns representing musical notes and horizontal rows representing time intervals. Each note of a musical piece is indicated by a selected note symbol in the appropriate column, and extending across multiple rows if intended to be sounded for more than one time interval. Different note symbol shapes are used to indicate different tone qualities or playing styles. Note symbols are colored or graphically textured to indicate different sound intensities. Suggested fingerings may be indicated by numbers marked the note symbols, or by lines connecting notes to be played with the same finger. Other graphical design elements may be used to display rhythmic or harmonic context and, in computerized applications, to show or hide selected musical information, or to activate and listen to a sound recording of a piece of music or individually selected notes.

20 Claims, 8 Drawing Sheets

U.S. PATENT DOCUMENTS

| | | | |
|---|---|---|---|
| 6,689,946 | B2 | 2/2004 | Funaki |
| 6,977,334 | B2 | 12/2005 | Kimbrough |
| 6,987,220 | B2 * | 1/2006 | Holcombe .................. 84/483.2 |
| 7,148,414 | B2 | 12/2006 | Kestenbaum et al. |
| 7,212,213 | B2 | 5/2007 | Steinberg et al. |
| 7,378,585 | B2 | 5/2008 | McGregor |
| 7,439,438 | B2 | 10/2008 | Hao |
| 7,521,619 | B2 | 4/2009 | Salter |
| 7,767,895 | B2 * | 8/2010 | Johnston .................. 84/483.2 |
| 2006/0107819 | A1 | 5/2006 | Salter |
| 2008/0295670 | A9 | 12/2008 | Egan |
| 2010/0251875 | A1 * | 10/2010 | Johnston .................. 84/483.2 |

OTHER PUBLICATIONS

Sample of a Music Sheet "La Cadence" ©2004, herein the sheet illustrates a field for composer, S. Thalberg, and a copyright. Oct. 12, 2010.*

Wikipedia, article re Klavarskribo from Internet at http://en.wikipedia.org/wiki/Klavar (3 pages).

Excerpt from Internet at http://www.soundonsound.com/sos/jul04/images/cubase1keyeditor.1.jpg (1 page).

Excerpt from Internet at http://www.soundonsound.com/sos/jan04/images/logicnotes2.1.jpg (1 page).

Excerpt from Internet at http://www.soundonsound.com/sos/jul05/images/cakewalk3.1.jpg (1 page).

Excerpt from Internet at http://www.audioutilities.com/midi-sequencer/midi-img/roll1.jpg (1 page).

Excerpt from Internet at http://www.muse-sequencer.org/pic/wiki/pianoroll.jpg (1 page).

Excerpt from Internet at http://www.soundonsound.com/sos/jan04/images/melodyne2edit.1.jpg (1 page).

Excerpt from Internet at http://www.soundonsound.com/sos/nov06/images/waves2tuneweird_.1jpg (1 page).

Excerpt from Internet at http://www.timewarptech.com/Images/Products/HC2KImages/pianoroll.gif (1 page).

KlavarScript—klavar notation software Dec. 2006, viewed at www.vdkolk.nl/klavar/en/intro.htm on Nov. 2, 2007.

Shoen, Julius, Shoen Musical Notation, © 2004, music oriented in columns and rows, with supplemental columns.

Klavarscript example, example entered by examiner with Klavarscript in Nov. 4, 2007.

* cited by examiner

MUSIC NOTATION SYSTEM

CROSS-REFERENCE TO RELATED APPLICATIONS

This application is a continuation of application Ser. No. 11/955,730, filed on Dec. 13, 2007 and now pending, which claims the benefit of Provisional Application No. 60/870,203, filed on Dec. 15, 2006. Both said applications are incorporated herein by reference in their entirety for continuity of disclosure.

FIELD OF THE INVENTION

The present invention relates in general to music notation systems and methods for teaching students to play musical instruments.

BACKGROUND OF THE INVENTION

The standard system of music notation uses an upper (or treble) clef and a lower (or bass) clef, each clef having five parallel horizontal lines, with each line and intervening space representing a specific note on the A-G scale, corresponding to the white keys on a piano. To indicate that a particular note is to be played, an oval note symbol is centered on the line, or marked in the space, corresponding to the desired note. When a desired note does not come within either of the standard clefs, supplemental spaced lines must be added above or below the appropriate clef, allowing the desired note to be marked on or adjacent to one of the added lines. A person reading the music thus notated can determine the identity of a note above or below a clef with reference to the number of added lines.

When a desired note corresponds to one of the black keys on a piano, a note symbol is marked on a line or in a space corresponding to a note adjacent to the desired note, and an "accidental" symbol (i.e., a "sharp" or "flat" symbol) is added to the note symbol, indicating that the note to be played is actually one half-tone higher or lower (as the case may be) than the note symbol would otherwise suggest. Key signatures are indicated by showing sharp or flat symbols at the left end of each clef, corresponding to the sharp or flat notes in the scale of the musical key in question (e.g., C major, E-flat minor, etc.). This makes it unnecessary to use accidentals every time the music calls for a note corresponding to a black key. At the same time, however, it can complicate matters for the music student, who must learn to remember that not every note symbol necessarily means what it might appear to mean at first glance, but must be interpreted with reference to the relevant key signature. Even for accomplished musicians, it makes music-reading more difficult in the case of compositions written in keys having a large number of sharps or flats.

In the standard notation system, vertical lines are drawn across the clefs to indicate the beginning or end of each bar (or "measure") in a musical composition. A bar represents a specific number of beats (or time intervals) corresponding to the time signature (i.e., tempo) of the music. For example, a "¾" time signature indicates that 3 quarter-notes (or notes totaling the equivalent thereof) are to be played per bar (i.e., waltz tempo), whereas a "⅝" time signature indicates that 6 eighth-notes are to be played per bar. The time signature is typically indicated at the left end of each clef. When a particular note symbol requires an accidental, and when the same note is to be played more than once within the same bar, the accidental is applied only to the first corresponding note symbol in the bar, and the reader is to understand that the same accidental is implied in respect of every other corresponding note symbol in the bar. This convention avoids the need to use accidental symbols for each and every sharp or flat note, but it presents yet another difficulty for someone learning to read and play music—once again, not every note symbol necessarily means what it indicates at first glance.

The standard notation system uses various ways to indicate the length of a note, or the duration of time for which it is to be held. For example, if the oval note symbol is solidly shaded and has a vertical stem line, it indicates a quarter-note. A similar notation but with the oval note symbol being unshaded, denotes a half-note. An unshaded note symbol with no stem line denotes a whole note, corresponding to the length of a bar. Notes of shorter duration than a quarter-note are indicated as for quarter-notes, but with one or two or more angled lines marked on the stem lines, with each angled line indicating that the note length is to be half of what it would have been without the angled line. For instance, an eighth-note looks like a quarter-note with one angled line of the stem, a sixteenth-note looks like a quarter-note with two angled lines, and so on. Another convention used in the standard notation system is to place a dot to the right of a note symbol, indicating that the note is to have a duration 50% greater than would otherwise have been suggested. For instance, a quarter-note with a dot beside it would have a duration equal to one-and-a-half quarter-notes. As the preceding examples illustrate, the standard music notation system incorporates several different and non-intuitive conventions for indicating note length, thus giving new students even more rules to remember as they learn to read music.

The standard notation system uses a system of letters (e.g., p, mf, sfz, etc.) and symbols (e.g., for crescendos and accents) to indicate sound intensity, or volume. These markings can easily be misunderstood or missed entirely.

Standard notation lacks an integrated system for indicating the harmonic structure of a musical composition. While chord names (e.g., Bmin7) may be included in some music scores and charts, the actual notes that constitute the chords are not shown. Likewise, the notes of the scales or modes suitable for improvisation are not typically shown in standard notation.

In addition to standard notation, many alternative systems have been developed to visually represent music. Among these, "piano roll" notation and Klavarskribo (or Klavar) address some of the usability issues of standard notation, while neglecting or creating other issues. For example, piano roll notation, often seen in music production software, typically provides color coding, variable-length symbols to indicate note duration, and a chromatic keyboard-style layout. However, piano roll notation is best suited to music editing, rather than learning and performance. The user is presented with visual representation of notes, but no guidance on which hand or finger plays the notes, or design elements to provide context within the layout. Also, the connection lines in standard notation that indicate musical phrases or groups of notes are absent in piano roll notation.

The foregoing discussion illustrates only some of the features of the standard and known alternative music notation systems that make it difficult for many people to learn to read and play music. In view of such known difficulties associated with the standard notation system, there is a need for a new music notation system that is easier to read and learn. In particular, there is a need for a new music notation system that is less abstract that the standard system, by using note representations that are visually referable to the notes on a keyboard instrument. There is a further need for a new music notation system that uses separate note indications for each specific musical tone, without requiring special markings to indicate the musical octave in which a desired note is located. In addition, there is a need for a new music notation system that eliminates the need for accidental symbols to indicate notes corresponding to black keys on a keyboard music notation system, such that each note indication denotes precisely the same note in all contexts, regardless of the key signature. There is a yet further need for a music notation system that provides a direct visual representation of note lengths, thus eliminating the need to interpret note indications in accordance with non-intuitive conventions in order to determine how long the indicated notes are to be held. The present invention is directed to these needs.

BRIEF SUMMARY OF THE INVENTION

In general terms, the present invention is a keyboard-based music notation system that uses a grid having vertical columns and horizontal rows, with the columns representing semitone intervals (each equivalent to a note in the chromatic scale), and the rows representing time intervals (i.e., beats). Each column represents a specific musical tone (for example, middle C, or A-flat above high C) having a defined sonic frequency (measured in cycles per second, or Hertz). Heavy horizontal lines are used to indicate the beginning and end of bars or measures, or rhythmic groupings of beats. For example, every fourth horizontal line may be a heavy line in music having a 4/4 time signature, whereas every third horizontal line may be a heavy line for music in 3/4 time (i.e., waltz) or 12/8 time (i.e., swing).

In order to indicate a particular note from a musical composition, a selected note symbol is marked on the grid in the column corresponding to the desired note, at the intersection with the appropriate time interval row. In other words, the note symbol will lie within a "box" formed by the intersection of a given column and row. Where a note is intended to be held for more than one beat, the corresponding note symbol is elongated to extend vertically across the appropriate number of horizontal rows in the grid. The shape of the note symbols indicates tone quality or playing style (for example, legato or staccato), in accordance with a specified tone quality protocol. Selected graphical treatments (e.g., colors, shading, cross-hatching, or other graphical texturing) are applied to the note symbols, in accordance with a specified sound intensity protocol, to indicate the loudness with which each note is to be sounded. Connecting lines may be used to indicate note groupings of notes, with the configuration of the connecting lines (e.g., solid, dotted, dashed, etc.) also denoting playing style if desired.

For notation of music intended to be played on a keyboard, suggested fingerings may be indicated by digits placed inside the note symbols. Alternatively, fingerings may be indicated by lines drawn between notes to be played with the same finger. Additional graphical design elements and methods may be used to display rhythmic context (e.g., groupings of beats) or harmonic context (e.g., underlying chords or scales); to show or hide different types of musical information (particularly in association with computerized or video applications of the notation system); or to activate and listen to a sound recording of a piece of music or individually selected notes.

BRIEF DESCRIPTION OF THE DRAWINGS

Embodiments of the present invention will now be described with reference to the accompanying figures, in which numerical references denote like parts, and in which.

DETAILED DESCRIPTION OF THE PREFERRED EMBODIMENT

Figure 1:
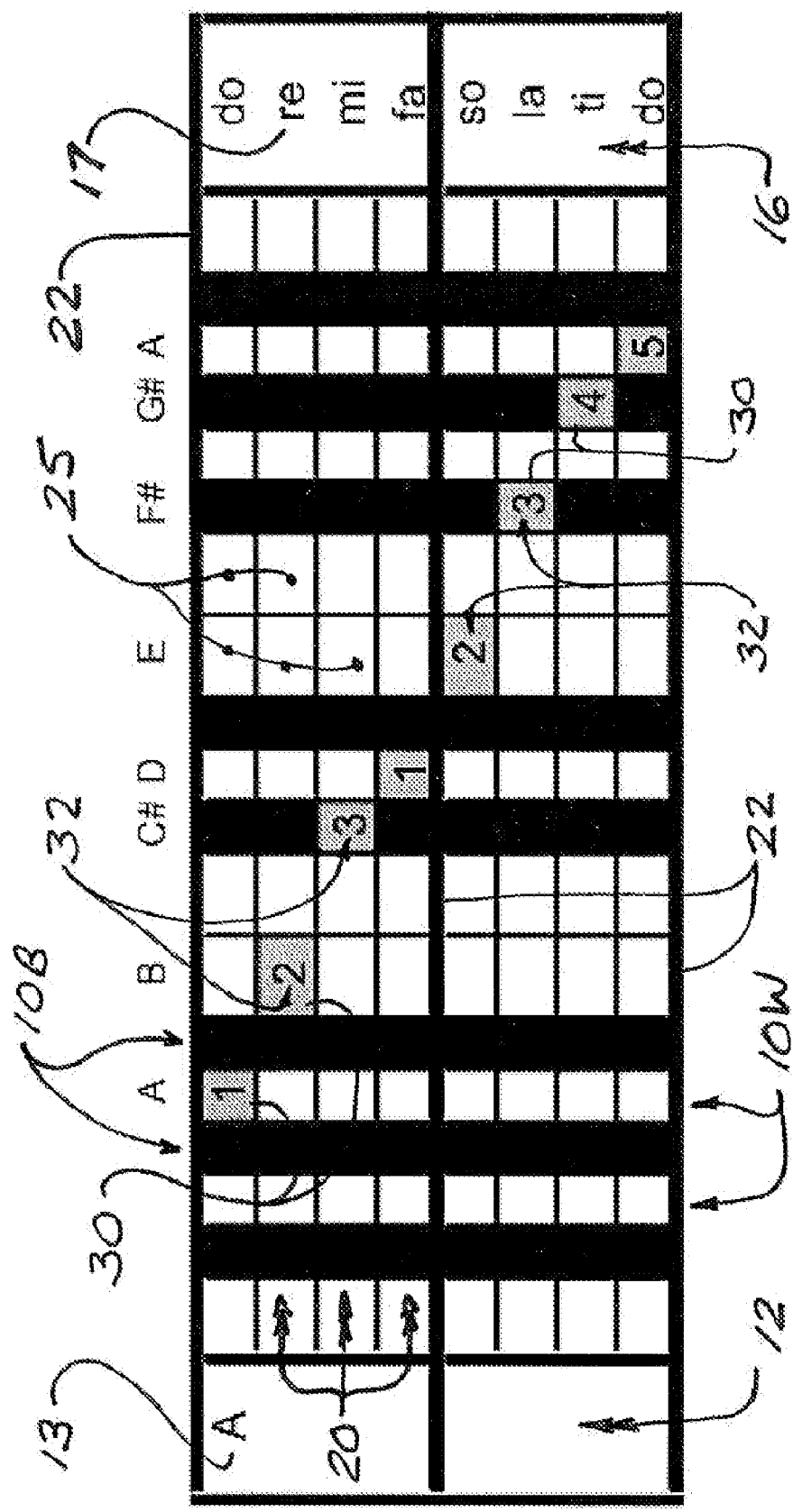
FIG. 1 illustrates an A-major scale written on a music notation grid in accordance with one embodiment of the notation system of the present invention, including notations relating to playing style, loudness, and suggested fingering.

In the preferred embodiment, the music notation system of the present invention uses a grid laid out in a fashion analogous to a piano keyboard, as illustrated in FIG. 1, with vertical columns (or "key columns") 10W corresponding to the white keys on a piano, and key columns 10B corresponding to the black keys on a piano. Key columns 10W and 10B are intersected by horizontal rows (or "beat rows") 20 which represent time intervals or beats. The beginning and end of each bar or measure or rhythmic grouping of beats in a given musical piece are indicated by heavy horizontal lines (or "bar lines") 22. Optionally, graphical rhythm indication means may be applied to selected groups of beat rows, to denote emphasis on particular beats or to otherwise indicate suggested rhythms for performance of the music. In preferred embodiments, the graphical rhythm indication means will be in the form of shading or coloring applied to selected beat rows. However, persons skilled in the art will appreciate that the graphical rhythm indication means could be provided in various alternative forms that will visually distinguish the selected beat rows from other beat rows in the grid.

Figure 2:
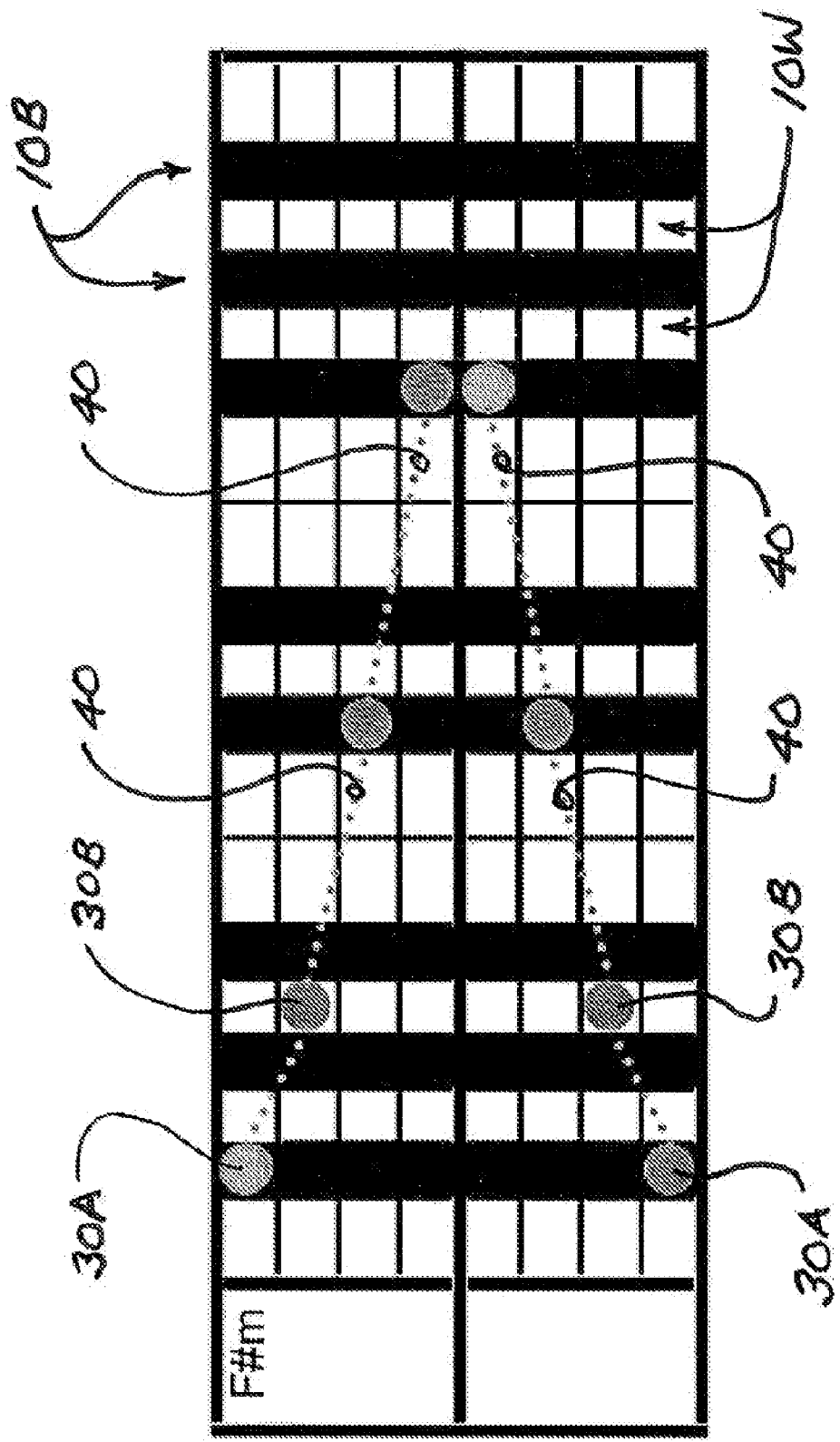
FIG. 2 illustrates an F-sharp minor arpeggio written in accordance with an embodiment of the notation system, indicating that the arpeggio is to be played softly but with accents on selected notes.

Key columns 10B corresponding to black keys on a piano are preferably black or otherwise darkly shaded, thus providing a sharp visual contrast from key columns 10W corresponding to the white keys on a piano. For simplicity, key columns 10W and 10B may be of equal width, but these widths preferably will be made different to assist the user in differentiating keys. For example, in FIGS. 1-3, the key columns 10W corresponding to natural notes B, C, E, and F are shown distinctly wider than the key columns 10B, making the grid more visually analogous to a keyboard and thus facilitating the identification of individual notes.

Using a grid of this type, no interpretation is required in order to determine which notes are to be played, and the need for sharp, flat, and natural symbols is eliminated. As illustrated in the Figures, music written in accordance with the notation system of the present invention is read vertically, either upward or downward depending on the preference of the composer or transcriber of the music, and/or the graphical medium being used to display the music. For example, it may be preferable for digitally-displayed music (e.g., on a computer monitor) to be read upward, while music on printed/paper copies is to be read downward.

Figure 8:
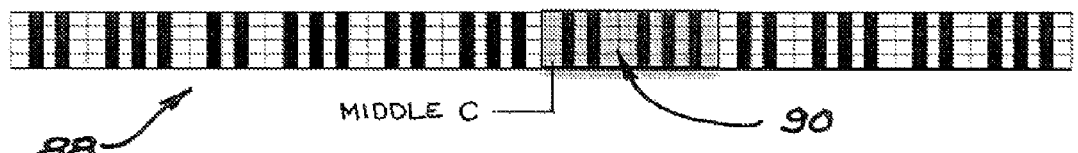
FIG. 8 illustrates a legend that shows the context of a musical piece, when only a portion of the keyboard is used.

The number of key columns (10W, 10B) in the grid may be adjusted according to the range of notes used in a particular musical piece. For example, if the notes within a musical piece (or musical passage) span less than one octave (i.e., 12 semitones), the number of columns may be reduced to 12. In order to indicate the particular octave or octaves within which the piece (or passage) is to be played, a keyboard context legend may be provided in association with the notated music. In a preferred embodiment of the system, and as shown in FIG. 8, the context legend is provided in the form of a representation 88 of a piano keyboard, with shading 90 applied to the section of representative keyboard 88 corresponding to the octaves in the notated music. Although shown in large scale in FIG. 8, representative keyboard 88 will preferably be small compared to the grid of the notation system, such that it can be shown fairly unobtrusively adjacent to the grid wherever the music requires a change in keyboard context.

In order to write or notate a particular note from a musical composition using the present music notation system, a selected note symbol 30 is marked on the grid in the key column (10W or 10B) corresponding to the desired note, at the intersection with the appropriate beat row 20. In other words, the note symbol 30 will lie within a "box" 25 formed by the intersection of a given key column (10W or 10B) and beat row 20. The shape of the note symbol 30 indicates tone quality or playing style, in accordance with a specified tone quality protocol In accordance with a preferred tone quality protocol as shown in the Figures, a square or rectangular note symbol 30 indicates a smooth legato playing style (as in FIG. 1, for example), whereas circular note symbols indicate a staccato style calling for the note to be sounded and quickly released (see FIG. 2).

Although the tone quality protocol described herein uses rectangular and circular note symbols 30 to denote legato and staccato playing styles respectively, the use of these particular shapes or any alternative shapes are purely matters of choice, and are not essential to the present invention. Persons skilled in the art of the invention will appreciate that additional or alternative note symbol shapes (e.g., triangles, diamonds, hexagons, octagons, ovals, freeform shapes) could be used to indicate legato, staccato, and/or other playing styles, without departing from the basic concept of the present invention.

Figure 3:
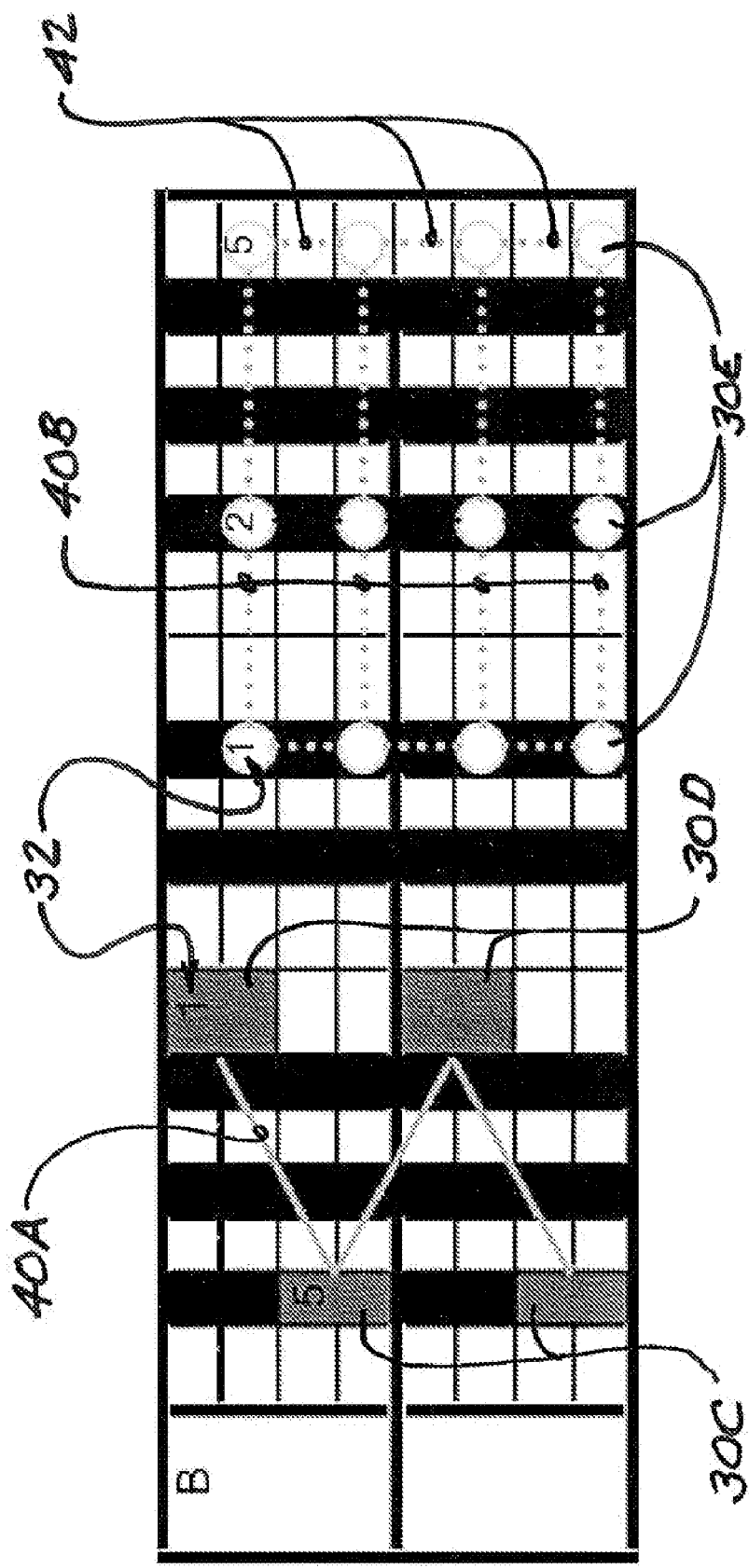
FIG. 3 illustrates how chords and sustained notes may be indicated in accordance with one embodiment of the notation system of the present invention.

If a note is to be held for a full beat (for example, the equivalent of a quarter-note in standard notation), the note symbol will a rectangular shape occupying the entire intersection box 25 in question. This can be seen from FIG. 1, in which all indicated notes are analogous to quarter-notes. If a note is to be held longer than one beat, the rectangular shape is simply extended vertically to occupy all of the boxes 25 corresponding to the number of beats for which the note is to be held. For example, FIG. 3 shows rectangular note symbols 30C and 30D analogous to semitones F-sharp and B respectively, each occupying two vertically contiguous intersection boxes 25. To indicate a whole note (i.e., equivalent to four beats), in a grid where each beat row 20 corresponds to a quarter-note, the note symbol would be extended to occupy four vertically contiguous boxes 25.

FIG. 3 also illustrates how chords can be written using the notation system of the present invention. In FIG. 3, staccato note symbols 30E are shown in the key columns corresponding to D-sharp, F-sharp, and B, which form a B-major chord. These notes are repeated in every second beat row, indicating that the B-major chord is to be played in staccato fashion on the second and fourth beats of each bar (in a ¼ time signature).

A system of lines or shapes or other appropriate note-grouping means may be used to connect, associate, or group notes. In a preferred embodiment of the notation system, notes played with the left hand are connected by one set of lines, and notes played with the right hand are connected by another set of lines. For example, in FIG. 3, lines 40A connect notes to be played with the left hand, and lines 40B connect notes to be played with the right hand. Notes played in sequence occupy different rows in the grid, and therefore are joined by angled lines (if the notes are different) or vertical lines 42 (if the same note or notes are repeated).

In FIG. 3, lines 40A are of solid form, denoting a smooth transition between the connected notes (in keeping with the indicated legato note symbols 30C and 30D). Notes played in a chord occupy the same row on the grid, and are therefore joined by horizontal lines, to further indicate that the notes are played at the same time. As illustrated in FIG. 3 by way of example, horizontal lines 40B between the notes of the B-major chord (formed by staccato note symbols 30E) can be dotted or stippled to provide an additional indicator or reminder that the chord is to be played staccato. However, this particular variant is not essential to the present notation system; users may select or develop different line pattern protocols to indicate particular performance technique and style instructions or suggestions.

Optionally, notes played simultaneously with different hands may be joined by a horizontal line, typically with a differentiating color or pattern than other lines. Connecting lines may also join notes that are played with the same finger. Notes may also be grouped together using alternative note-grouping means, such as encircling or surrounding shapes such as ovals, rectangles, or other multisided (e.g., hexagonal, octagonal) or freeform shapes. These shapes do not necessarily need to employ an outline, or stroke line, and may therefore appear as shading. Notes may also be associated with lines, shapes, shading or symbols to indicate other common qualities of the notes, or sections of the musical piece, such as usage of a sustaining pedal or controller.

Figure 4:
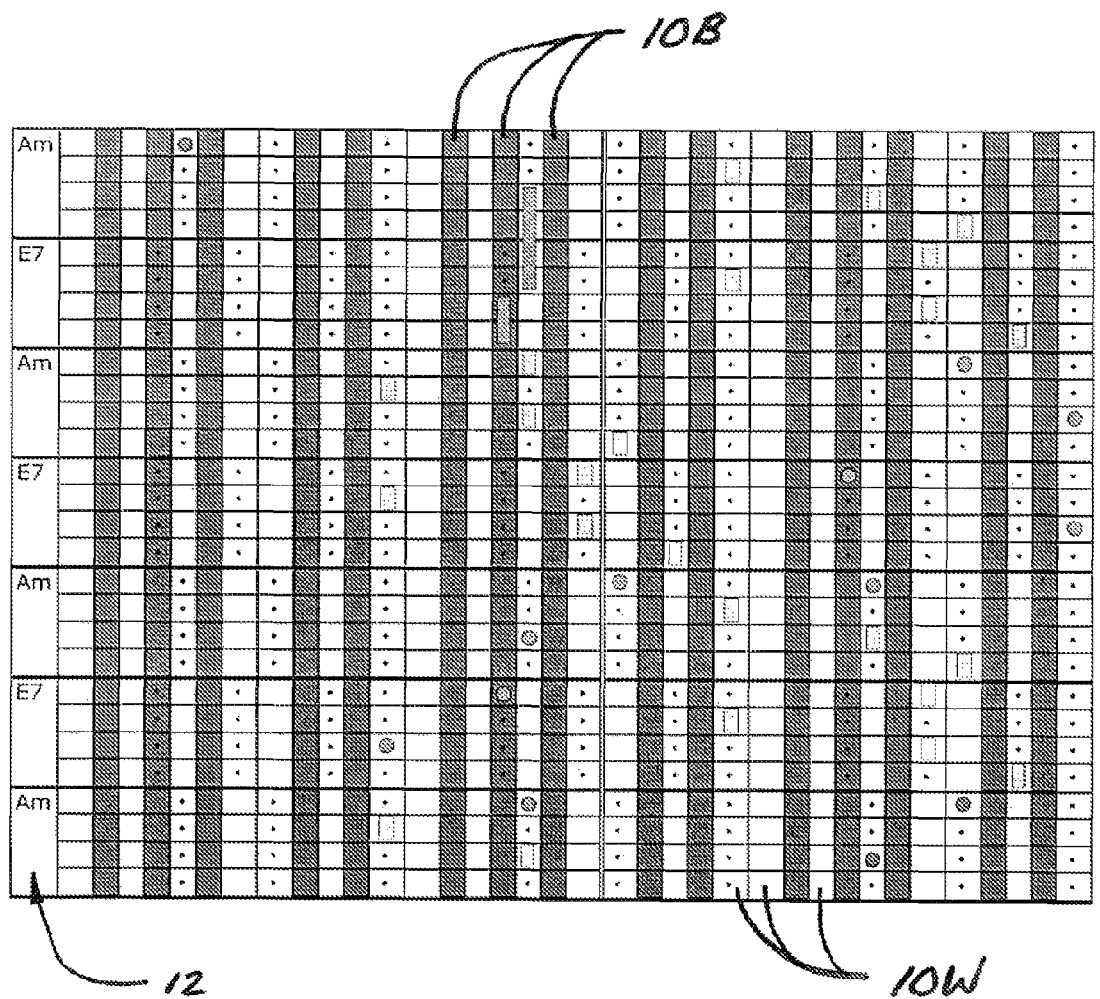
FIG. 4 is an exemplary illustration of a musical passage written in accordance with an alternative embodiment of the notation system, demonstrating the use of symbols to indicate harmonic context.
Figure 5:
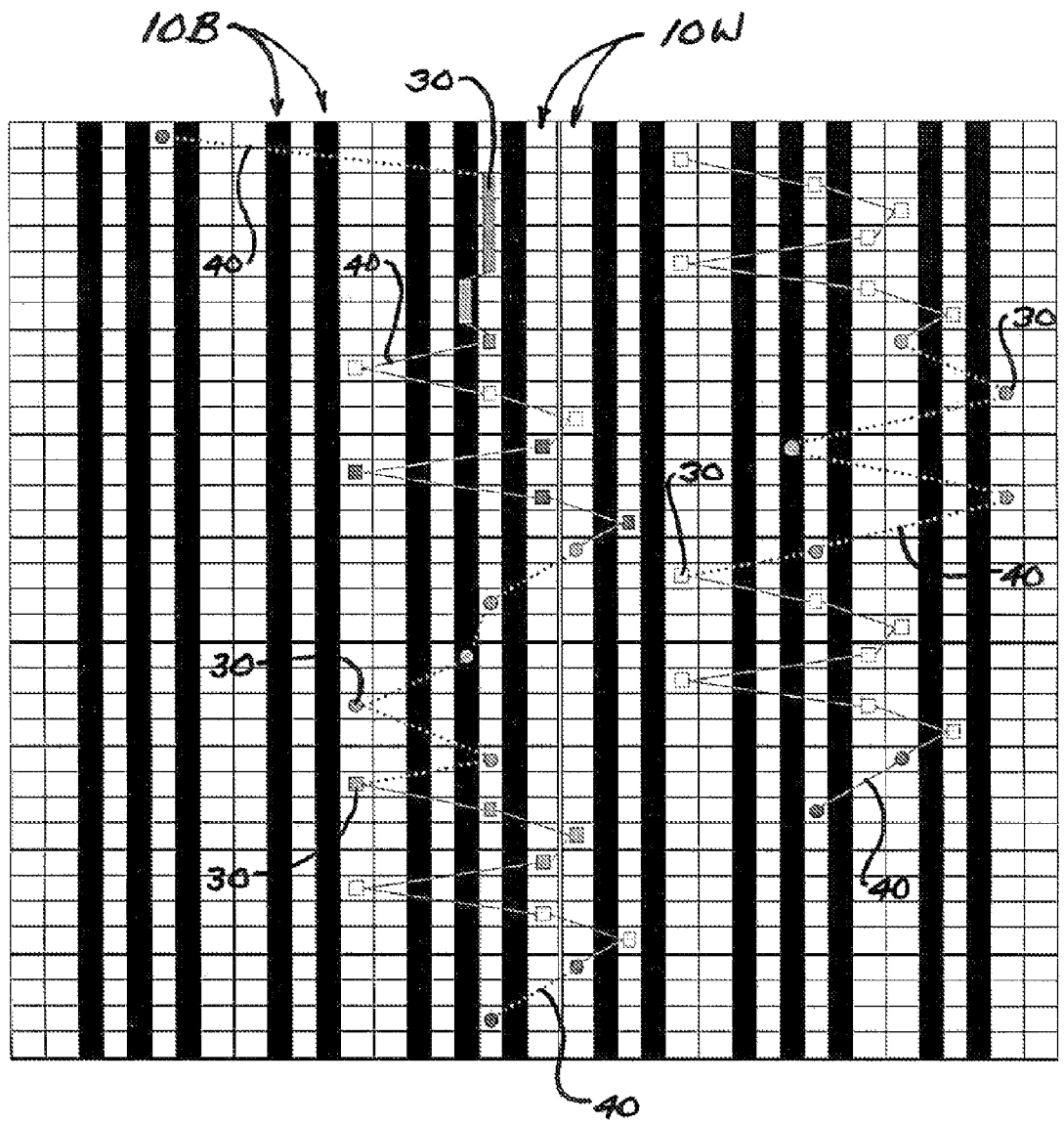
FIG. 5 is an exemplary illustration of a musical passage written in accordance with an embodiment of the notation system, demonstrating the optional use of connection lines for legato and staccato notes, and for grouping notes according to left and right hands.

FIG. 4 provides an illustration of how the notation system of the present invention can be easily adapted for music that contains notes of shorter duration than quarter-notes. FIG. 4 shows a passage from J. S. Bach's "Two Part Invention 13", which has a ¼ time signature, but makes extensive use of sixteenth-notes. To show this music in easily understood fashion, the grid contains a total of sixteen horizontal beat rows for each bar, with intermediate heavy horizontal lines denoting quarter-note intervals. Accordingly, each beat row in FIG. 4 corresponds to a sixteenth-note.

Although the basic system of the present invention incorporates horizontal rows each corresponding to a fixed time interval or beat, variations on this feature may be devised to facilitate representation of other musical characteristics. For example, selected rows could be made of noticeably increased height to indicate a ritardando (decreasing tempo), or row lines could be removed altogether to indicate a rubato style (i.e., with tempo variations).

An additional feature of the present music notation system is the ability to indicate the desired amplitude or loudness of the notes, according to the color or other visually-discernible texturing of the note symbols. Preferred embodiments of the system use a color-based protocol for indicating loudness, and many variations of such a protocol are possible. However, a particularly preferred embodiment uses the following color-based loudness protocol, corresponding to traditional loudness notations:

Blue: pp (very soft)
Green: p (soft)
Yellow: mp (medium soft)
Buff: mf (medium loud)
Orange: f (loud)
Red: ff (very loud)

In the protocol shown above, the amplitude or loudness corresponds to the wavelength of the color, such that quieter notes have a shorter wavelength (blue or green), and louder notes have a longer wavelength (orange or red), with notes of moderate volume being yellow. Longer notes may have gradations of color to indicate changing volume.

It will be appreciated that a variety of alternative protocols may be developed for purposes of showing loudness. For example, different stippling or cross-hatching patterns could be used to indicate different loudness levels, thus allowing reproduction of music written in accordance with the present invention without need for color printing facilities.

The notation system of the present invention also makes it very easy to show recommended fingering, by marking a finger number inside a given rectangular or circular (or otherwise-shaped) note symbol 30. Examples of such fingering notations 32 may be seen in FIGS. 1, 3, and 6. Preferably, the fingering notations 32 will be black (or another dark color) so as to provide sharp contrast to the loudness-indicating background color (or shading) of the note symbol 30. Where the background color (or shading) is particularly dark, however, fingering notations 32 could alternatively be shown in a light color.

Figure 6:
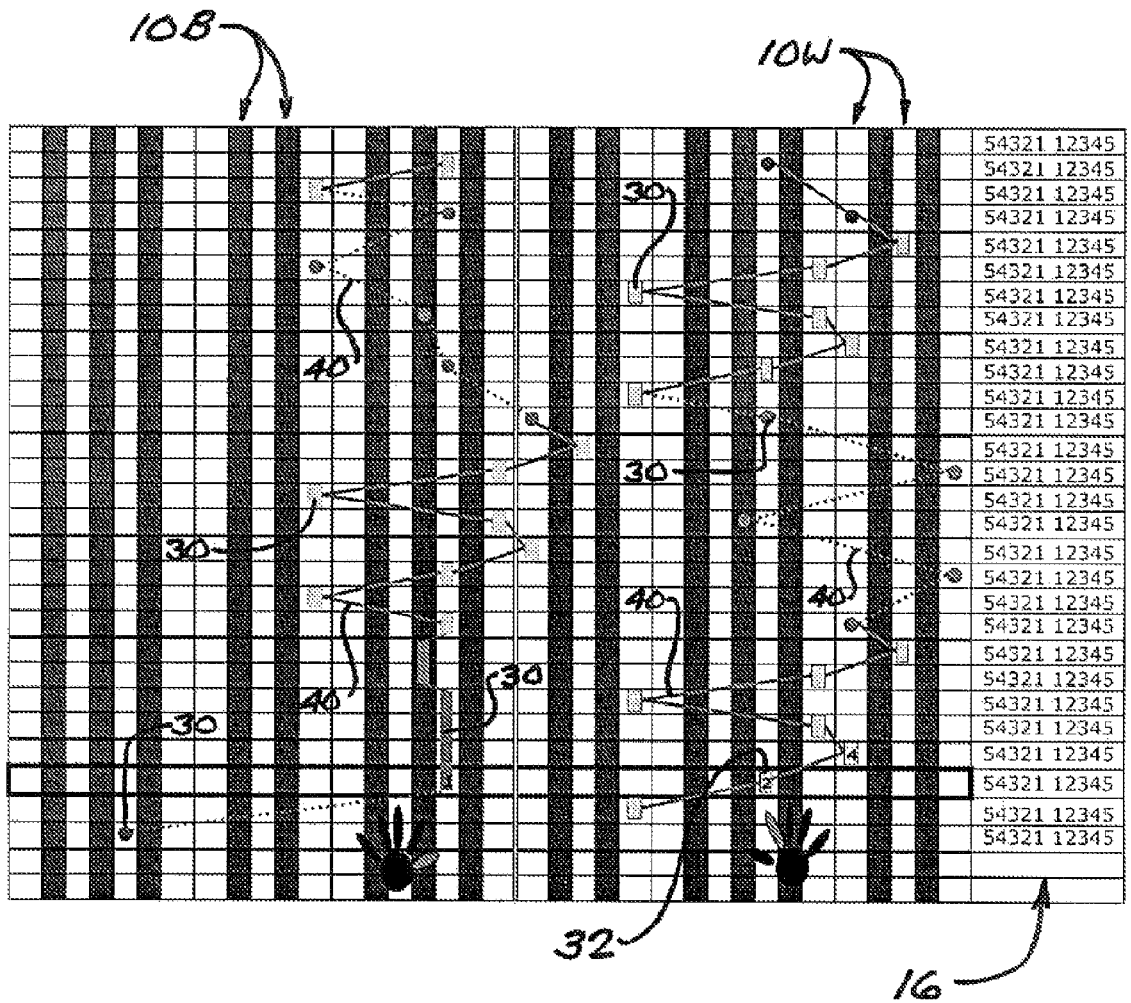
FIG. 6 illustrates a musical passage with suggested fingerings shown in accordance with one embodiment of the notation system.
Figure 7:
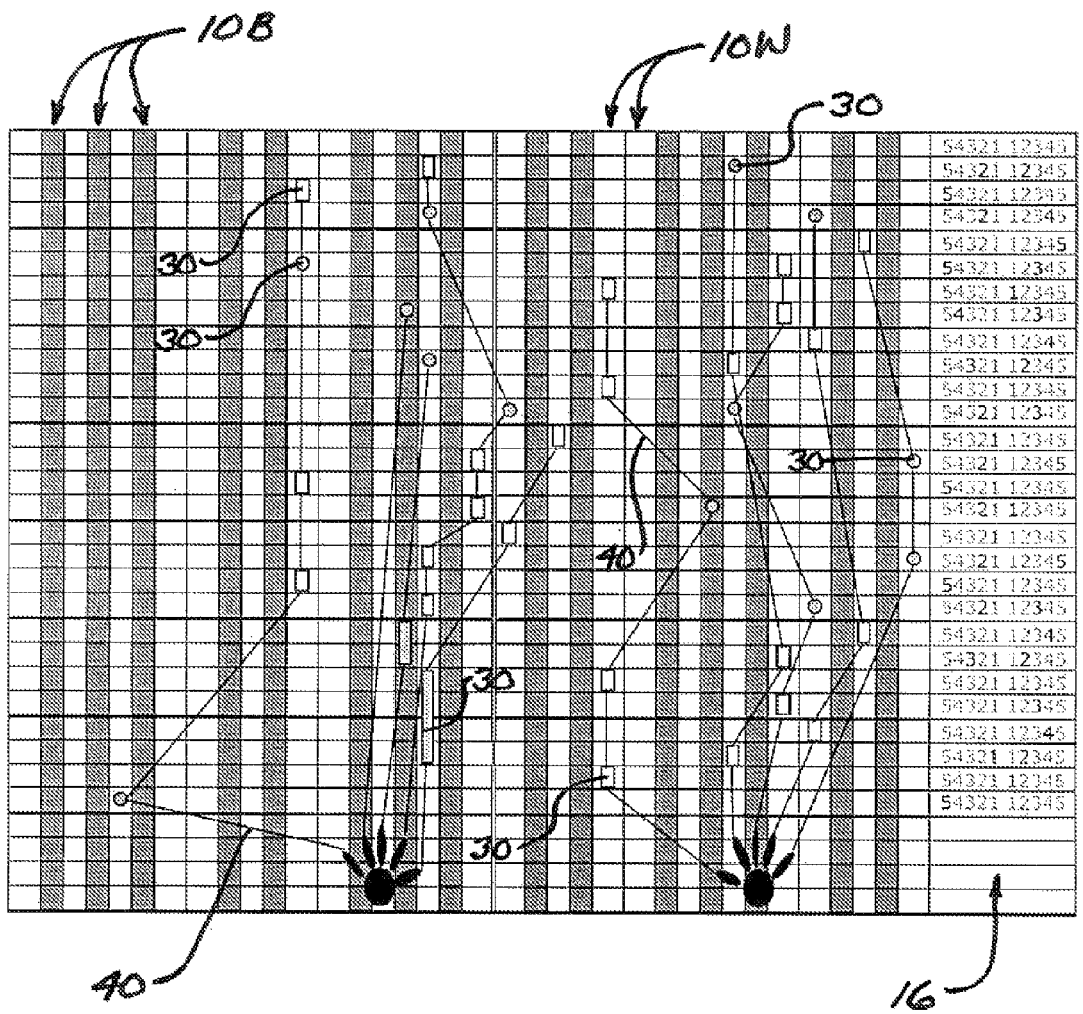
FIG. 7 illustrates a musical passage with suggested fingerings shown in accordance with one embodiment of the notation system.

Alternatively or in addition, suggested fingerings may be depicted using a hand symbol as shown in FIG. 6, with the suggested finger of each hand color-coded as notes are highlighted. This method may be particularly useful when the input device or instrument is an electronic multiple-touch ("multi-touch") display, rather than a traditional keyboard. Another option to indicate suggested fingerings is to display connection lines between notes using the same finger, as illustrated in FIG. 7.

Figure 9:
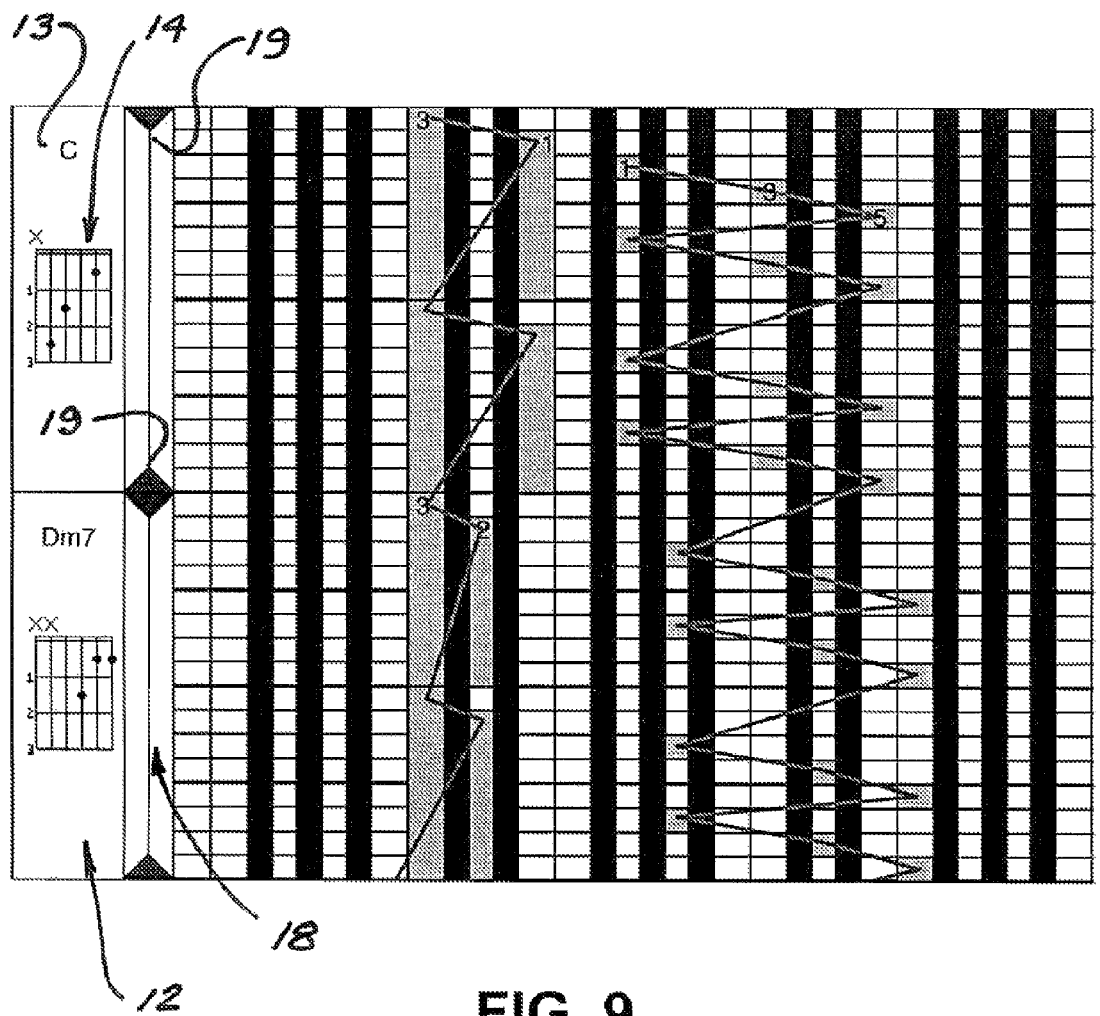
FIG. 9 illustrates a musical passage with supplementary columns for indicating guitar chord diagrams and sustain pedal usage.

Additional vertical columns may optionally be provided at the left and/or right sides of the grid to indicate supplementary musical information. For example, as shown in FIGS. 1-4, a supplementary column 12 may be provided at the left side of the grid to indicate musical key notations 13 corresponding to individual bars of music (and/or to show guitar chord diagrams 14 as shown in FIG. 9). As shown in FIG. 1, a further supplementary column 16 may be included to show supplementary text 17 such as song lyrics. As shown in FIG. 9, another supplementary column 18 could also be added to show instructions 19 for usage of the sustain pedal (for performance of music on a piano) or other input devices or sound-modifying controllers (e.g., pitch bender, wah-wah pedal, Leslie, etc.). In the particular example shown in FIG. 9, the instructions 19 in supplementary column 18 relate to sustain pedal usage, with downward-pointing triangles indicating places in the music where the pedal is to be depressed ("pedal down") and upward-pointing triangles indicating where the pedal is to be released ("pedal up").

Tempo can be indicated in any convenient fashion, as desired. For example, tempo may be displayed at the top of the piece, and may be expressed as number of beats per unit of time (beats per minute or beats per second). Alternative units may be derived and displayed in computerized versions of the system, such as frames per beat (for video or computer applications of the system).

Music written in accordance with the notation system of the present invention may be represented or reproduced using a variety of media. In addition to being printed on paper media, music could also be represented on a computerized digital display and displayed on a monitor or shown on video. These variants can be particularly beneficial to facilitate the use of a color-based loudness protocol as previously described. In addition to displaying the notation, some electronic displays such as touch screens may be used as input devices. Embodiments may be configured such that touching a note on the screen results in the note being sounded in the computer, using digital audio sound files, or MIDI notes in conjunction with a digital sound source. Embodiments may be further configured such that multiple notes may be triggered from an electronic display system that accepts multiple touch (multi-touch) input, enabling performance of musical pieces from a touchscreen rather than a traditional music keyboard.

For teaching purposes in particular, the system could be used in conjunction with a fixed medium, such as a whiteboard, on which the basic notation grid is marked, with movable media that can be attached or otherwise applied to the fixed medium to indicate musical notes. For example, the movable media could be variously-colored round or rectangular note symbols, with integral magnets so that they can be easily applied to a grid marked on a ferrous-based whiteboard.

A zoom or pop-up feature in computerized or video versions of the system, or an inset in printed versions, can be used to show greater detail than may be practical in the overall view, such as to indicate musical ornaments, trills, lyrics, effects, controller usage instruction data, user comments, etc. For example, the letter "z", a magnifying glass icon, or some other symbol superimposed on a note could indicate this type of additional information.

In another variant of the system, multiple grids are simultaneously displayed, in such a way that layers of grids appear superimposed. Layers may be selected interactively by the user and may be selectively hidden, or may be viewed as "active" (i.e., prominently displayed) or "inactive" (i.e., less prominently displayed), with the symbols in inactive layers being colored grey. The additional grid layers may be used to indicate parts written or composed by different persons, parts intended to be played or sung by different persons, parts played by different musical instruments, or different sounds produced by the same instrument. Where grey symbols in the shape of circles, squares and/or rectangles are present on the same grid location, outlines of the symbols are presented in different shades of grey. Each layer is numbered (e.g., chronologically), and contains a field for the name of the writer or composer, as well as an optional digital signature and/or other system for attribution or digital management of copyright. Printed copies will normally contain the active layers as selected by the user or publisher, including attribution for the composers and/or writers of the active and original layers.

Other layers may be used to indicate the relevant chords and/or scales that are applicable at various times during the piece, with symbols displayed on the first beat of a chord change, or persistently throughout the piece. These symbols indicate alternative notes, different from the notes specified by the composer, provided as suggestions for accompaniment, improvisation, or as variations on the theme. Examples of such symbols are small filled dots to denote the notes of a chord (as shown in FIG. 4), small outlines of dots for the notes of a scale, and larger filled dots to denote chord roots. In the preferred embodiment of this variant, these symbols are displayed as black (when against a white background), white (when against a black background), or violet. Other shapes and colors may also be used, provided that they are easily distinguishable from notes to be played as specified by the composer. This layer may be displayed or hidden by the user of a computerized version for display or printing.

Users of computerized variants of the notation system may be presented with an option to transpose symbols on the grid. Since the grid incorporates a chromatic layout of notes, symbols may be automatically shifted to the left or right, by the number of semitones specified by the user, or by a standard number of semitones indicated by instrument (B-flat trumpet, E-flat saxophone, etc.).

Visual representations of music using the notation system will normally be created with computer software, including spreadsheet, graphic editing, and other third-party or custom applications. Symbols may be entered manually, imported from other music notation systems, or via MIDI ("Musical Instrument Digital Interface").

When the notation system is represented on a computerized digital display, the screen may be configured to manually advance (i.e., scroll) using an input device such as a keyboard, foot switch, or microphone (preferably voice activated). In addition, when an electronic musical instrument in connected to the computer via MIDI, the rows may be configured to advance (or scroll) automatically—for example, when the correct notes are played in sequence. Automatic scrolling may also be configured to correspond to a predetermined tempo, with or without audio playback such as a metronome or click track. Automatic or manual scrolling may be configured to advance the screen by row, bar, page, or other increment.

It will be appreciated that computer programmers of ordinary skill will be readily able to develop suitable software to facilitate the tasks of appending or inserting additional background grids and symbols, managing composer and writer attribution information, adding layers, selecting layers, selecting notes, activating or deactivating layers, zooming, adding/editing/deleting notes, and playing notes (using MIDI) or digital audio (e.g., MP3 files). Desirable software features would include clicking on a note symbol to play the note (using MIDI), clicking on a button or icon to play digital audio, clicking on a blank grid box to add a default note (e.g., a medium-volume legato note), click-and-drag to move a note, and double-clicking a note symbol to display a panel showing all options pertaining to the note.

It will be readily appreciated by those skilled in the art that various modifications of the present invention may be devised without departing from the essential concept of the invention, and all such modifications are intended to come within the scope of the present invention and the claims appended hereto. It is to be especially understood that the invention is not intended to be limited to illustrated embodiments, and that the substitution of a variant of a claimed element or feature, without any substantial resultant change in the working of the invention, will not constitute a departure from the scope of the invention. In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A method for visually representing music to be played on a keyboard instrument, said method comprising the steps of:
   (a) providing a grid having vertical columns and horizontal rows, said columns correlating to the black and white keys of a standard musical keyboard, and said rows representing time intervals;
   (b) applying selected note symbols to the grid to indicate notes to be sounded in selected time intervals, with each note symbol being visually representative of a selected tone quality and a selected note duration, in accordance with a predetermined tone quality protocol and a predetermined note duration protocol;
   (c) applying a selected graphical treatment to each note symbol, with each selected graphical treatment being representative of a specific sound intensity in accordance with a predetermined sound intensity protocol;
   (d) applying a first note-grouping means to a selected group of note symbols to identify notes to be played with a selected hand;
   (e) applying a second note-grouping means to a first set of one or more note symbols selected from the group of note symbols referred to in step (d), to identify notes to be played with a first selected finger of the hand selected in step (d);
wherein said first and second note-grouping means are visually differentiated from each other, and each of said note-grouping means is selected from the group consisting of encircling shapes, shading patterns, and lines.

2. The method of claim 1, wherein the note-grouping means applied to at least one group of note symbols also corresponds to a suggested performance instruction, in accordance with a selected note-grouping protocol.

3. The method of claim 1 wherein the note symbols which may be selected in accordance with the tone quality protocol comprise one or more shapes selected from the group consisting of circular, rectilinear, triangular, oval, hexagonal, octagonal, and free-form shapes.

4. The method of claim 1 wherein the graphical treatments which may be selected in accordance with the sound intensity protocol comprise a plurality of colors each representing a different specific sound intensity.

5. The method of claim 1 wherein the grid comprises one or more supplemental vertical columns containing supplemental musical information.

6. The method of claim 5 wherein the supplemental musical information contained in the one or more supplemental vertical columns is selected from the group consisting of chord names, chord diagrams, ornaments, song lyrics, musical tempos, sustain pedal usage instructions, and sound-modifying controller usage instructions.

7. The method of claim 1, wherein the music is visually represented by attaching removable media to fixed media.

8. The method of claim 1, wherein information relating to the music is visually represented on a set of multiple grids.

9. The method of claim 8 wherein the multiple grids are stored in a computer memory and wherein one or more of the multiple grids may be selectively displayed or hidden on a video display device.

10. The method of claim 1 in which the grid further comprises a field for identification of composers and copyright in respect of the subject music.

11. The method of claim 1 wherein the grid is stored in a computerized device having video display and audio playback capabilities.

12. The method of claim 11 wherein audio playback may be activated by clicking on selected note symbols on the video display.

13. The method of claim 1 further comprising the step of applying graphical rhythm indication means to selected groups of horizontal rows in the grid, to indicate suggested rhythms for performance of the music.

14. The method of claim 1 further comprising the step of applying graphical design elements to the grid to indicate harmonic context.

15. The method of claim 1 wherein the vertical columns correlating to notes B, C, E, and F on a standard musical keyboard are distinctly wider than the vertical columns correlating to other notes.

16. The method of claim 1, further comprising the step do applying a third note-grouping means to a second set of one or more note symbols selected from the group of note symbols referred to in step (d) in claim 1, to identify notes to be played with a second selected finger of the hand selected in step (d).

17. The method of claim 16 wherein the first note-grouping means comprises encircling shapes, and the second note-grouping means comprises connecting lines.

18. The method of claim 16 wherein the third note-grouping means comprises connecting lines.

19. The method of claim 18 wherein the connecting lines of the second and third note-grouping means are selected from the group consisting of solid lines, dotted lines, and dashed lines.

20. The method of claim 16 wherein the second and third note-grouping means are visually differentiated from each other.

* * * * *